United States Patent [19]

Bachl et al.

[11] Patent Number: 4,710,552

[45] Date of Patent: Dec. 1, 1987

[54] PREPARATION OF HOMOPOLYMERS OF ETHENE AND COPOLYMERS OF ETHENE WITH HIGHERα-MONOLEFINS USING A ZIEGLER CATALYST SYSTEM

[75] Inventors: Robert Bachl, Worms; Volker Warzelhan, Weisenheim; Guenther Schweier, Friedelsheim; Hans Gropper, Ludwigshafen; Wolfgang Ball, Mannheim, all of Fed. Rep. of Germany

[73] Assignee: BASF Aktiengesellschaft, Fed. Rep. of Germany

[21] Appl. No.: 876,299

[22] Filed: Jun. 18, 1986

Related U.S. Application Data

[63] Continuation of Ser. No. 666,480, Oct. 30, 1984, abandoned.

[30] Foreign Application Priority Data

May 10, 1984 [DE] Fed. Rep. of Germany ....... 3417238

[51] Int. Cl.$^4$ ..................... C08F 4/64; C08F 210/02
[52] U.S. Cl. .................................. 526/116; 502/113; 526/114; 526/129; 526/348.6; 526/901
[58] Field of Search .................................. 526/114, 116

[56] References Cited

U.S. PATENT DOCUMENTS

| | | | |
|---|---|---|---|
| 3,723,348 | 3/1973 | Apotheker et al. | 252/429 B |
| 4,098,979 | 7/1978 | Maemoto et al. | 526/142 |
| 4,151,337 | 4/1979 | Kanoh et al. | 526/116 |
| 4,508,842 | 4/1985 | Beran et al. | 526/141 |

FOREIGN PATENT DOCUMENTS

| | | | |
|---|---|---|---|
| 716176 | 8/1965 | Canada | 526/169.2 |
| 3242150 | 5/1984 | Fed. Rep. of Germany . | |
| 3242149 | 5/1984 | Fed. Rep. of Germany . | |
| 1309565 | 3/1973 | United Kingdom . | |
| 1582287 | 1/1981 | United Kingdom | 526/129 |

*Primary Examiner*—Edward J. Smith
*Attorney, Agent, or Firm*—Keil & Weinkauf

[57] ABSTRACT

Homopolymers and copolymers of ethene are prepared using a Ziegler catalyst system comprising (1) a transition metal catalyst component, (2) an organoaluminum catalyst component and (3) an organohalogen catalyst component, by a method in which the transition metal catalyst component (1) employed is a solid-phase product (VI) obtained by (1.1) first combining (1.1.1) an inorganic oxidic substrate (I), as the carrier, with (1.1.2) a solution (II) consisting of (IIa) a certain oxahydrocarbon and (IIb) a mixture of (IIb1) a vanadium trichloride/alcohol complex, (IIb2) a titanium trihalide or titanium trihalide/alcohol complex and, if required, (IIb3) a zirconium tetrahalide to form a suspension (III), evaporating down this suspension to form a solid-phase intermediate (IV), and (1.2) then (1.2.1) combining the solid-phase intermediate (IV) obtained from (1.1) with (1.2.2) a solution of an organoaluminum compound (V) to form a suspension, the resulting suspended solid-phase product (VI) being the transition metal catalyst component (1).

3 Claims, No Drawings

PREPARATION OF HOMOPOLYMERS OF ETHENE AND COPOLYMERS OF ETHENE WITH HIGHER α-MONOLEFINS USING A ZIEGLER CATALYST SYSTEM

This application is a continuation of application Ser. No. 666,480, filed on Oct. 30, 1984 abandoned.

The present invention relates to a process for the batchwise and, in particular, continuous preparation of homopolymers of ethene and, in particular, copolymers of ethene with minor amounts of $C_3$–$C_8$-α-monoolefins, in particular $C_4$–$C_6$-α-monoolefins, by polymerization of the monomer or monomers at from 30° to 200° C., in particular from 50° to 125° C., and under a pressure of from 0.1 to 200, in particular from 5 to 60, bar, using a Ziegler catalyst system comprising (1) a transition metal catalyst component, (2) an organoaluminum catalyst component of the formula $$AlR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is a number from 1 to 3, preferably 2 or 3, and (3) an organohalogen catalyst component (cocatalyst), with the provisos that the atomic ratio of the transition metal from the catalyst component (1) to aluminum from the catalyst component (2) is from 1:0.1 to 1:500, preferably from 1:0.2 to 1:50, and the molar ratio of the organoaluminum catalyst component (2) to the organohalogen catalyst component (3) is from 1:0.001 to 1:10, preferably from 1:0.01 to 1:0.8.

Polymerization processes of this type are known, and, for example, the process described in U.S. Pat. No. 3,723,348 or that described in British Pat. No. 1,309,565 may be considered to be representative in the present case.

The central feature of the stated method, as in other parallel methods, is the special embodiment of the Ziegler catalyst system.

It is known that special embodiments of this system are produced in order to achieve certain aims, such as the following:

(a) catalyst systems which are capable of giving a high yield of polymer, i.e. catalyst systems with a high productivity, i.e. systems in which the amount of polymer formed per unit weight of the catalyst component (1) is increased.

(b) Catalyst systems which, via variation of the ratios of their components, permit the molecular weight distribution of the polymers to be optimized; this is important for tailoring the performance characteristics of the polymers.

(c) Catalyst systems which display their advantageous actions even at relatively low temperatures; this may be important, for example, for dry-phase polymerization.

(d) Catalyst systems which influence the morphological properties of the polymers in a certain way, for example giving uniform particle size, a small fraction of very fine particles and/or a high bulk density; this may be important with regard to mastering the polymerization systems technically and working up the polymers and/or for the processability of the polymers.

(e) Catalyst systems which can be simply and reliably prepared and are easy to handle, for example those which can be prepared in an inert hydrocarbon medium.

(f) Catalyst systems which make it possible to manage with a relatively small amount of regulator in polymerizations in the presence of molecular weight regulators, such as hydrogen; this may be important, for example, for the thermodynamics of the procedure.

(g) Catalyst systems which permit the production of polymers having particularly pronounced stress cracking resistance, a property which is particularly important, for example, for liquid containers, especially containers in which corrosive liquids are to be stored.

(h) Catalyst systems tailored to special polymerization processes, for example those which are adapted to the specific features of either suspension polymerization or dry-phase polymerization.

(i) Catalyst systems giving polymers which on the one hand have a high molecular weight (strong finished product) and on the other hand can be processed without problems, i.e. high molecular weight polymers which can be relatively rapidly processed to give satisfactory shaped articles, even when relatively low processing temperatures and/or relatively weak processing forces are used.

(j) Catalyst systems which give polymers having particularly high rigidity; this property is desirable for many fields of use.

(k) Catalyst systems which, in continuous polymerization, give polymers whose properties fluctuate very little in the course of time.

From experience to date, there are, among the various aims, some which can be achieved by means of particular embodiments of the catalyst system only if other aims are neglected.

Under these circumstances, it is generally desirable to find embodiments which not only allow the selected aims to be achieved but also result in other desirable aims being neglected as little as possible.

It is an object of the present invention to provide a novel type of catalyst system by means of which, with similar aims, better results can be achieved compared with conventional systems, particularly with regard to the abovementioned aims (b), (g), (i) and (j), which should be achieved to a very high degree while at the same time aims (a) and (k) are achieved satisfactorily.

We have found that this object is achieved by means of a catalyst system which contains a special transition metal catalyst component (1) which must both be prepared in a particular manner and contain the transition metals vanadium, titanium and, advantageously, zirconium together in a particular form.

The present invention accordingly relates to a process for the batchwise and, in particular, continuous preparation of homopolymers of ethene and, in particular, copolymers of ethene with minor amounts of $C_3$–$C_8$-α-monoolefins, in particular $C_4$–$C_6$-α-monoolefins, by polymerization of the monomer or monomers at from 30° to 200° C., in particular from 50° to 125° C., and under a pressure of from 0 1 to 200, in particular from 5 to 60, bar, using a Ziegler catalyst system comprising (1) a transition metal catalyst component, (2) an organoaluminum catalyst component of the formula $$AlR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl preferably $C_2$–$C_8$-alkyl, and m is a number from 1 to 3, preferably 2 or 3, and (3) an organohalogen catalyst component (cocatalyst), with the provisos that the atomic ratio of the transition metal from the catalyst component (1) to aluminum from the catalyst component (2) is from 1:0.1 to 1:500, preferably from 1:0.2 to 1:50, and the molar ratio of the organoaluminum catalyst component (2) to the organohalogen catalyst component (3) is from 1:0.001 to 1:10, preferably from 1:0.01 to 1:0.8.

In the novel process, the transition metal catalyst component (1) used is a solid-phase product (VI), obtained by a method in which (1.1) first (1.1.1) a finely divided, porous, inorganic oxidic substance (I), which has a particle diameter of from 1 to 1,000, preferably from 1 to 400, μm, a pore volume of from 0.3 to 3, preferably from 1 to 2.5, cm$^3$/g and a specific surface area of from 100 to 1,000, preferably from 200 to 400, m$^2$/g and is of the formula $SiO_2.aAl_2O_3$ where a is a number from 0 to 2, in particular from 0 to 0.5, and (1.1.2) a solution (II), as obtained on combining (IIa) 100 parts by weight of a saturated aliphatic, or partially saturated aliphatic and partially aromatic, oxahydrocarbon of 1 or 2 oxa oxygen atoms and 4 to 18 carbon atoms, preferably 1 oxa oxygen atom and 4 to 10 carbon atoms, in particular a saturated alicyclic oxahydrocarbon of 1 oxa oxygen atom and 4 to 6 carbon atoms, especially tetrahydrofuran, and (IIb) from 0.01 to 50, preferably from 1 to 30, parts by weight of a mixture of (IIb1) 100 molar parts of a vanadium trihalide/alcohol complex of the formula $VY_3.nz$-OH, where Y is chlorine or bromine, preferably chlorine, n is from 1 to 6, preferably from 3 to 4, and Z is a monovalent saturated aliphatic, or partially saturated aliphatic and partially aromatic, hydrocarbon radical of not more than 10, preferably not more than 8, carbon atoms, in particular alkyl of not more than 6 carbon atoms, (IIb2) from 0.2 to 300, preferably from 0.5 to 100, molar parts of a titanium trihalide in which the halogen can be chlorine and/or bromine, preferably of a titanium trichloride, or of a titanium trihalide/alcohol complex of the formula $TiY_3.nz$-OH, where Y is chlorine or bromine, preferably chlorine, n is from 1 to 6, preferably 3 to 4, and Z is a monovalent saturated aliphatic, or partially saturated aliphatic and partially aromatic, hydrocarbon radical of not more than 10, preferably not more than 8, carbon atoms, in particular alkyl of not more than 4 carbon atoms, and (IIb3) advantageously, from 1 to 400, preferably from 3 to 200, molar parts of a zirconium tetrahalide in which the halogen can be chlorine and/or bromine, preferably of a zirconium tetrachloride, are brought into contact with one another to form a suspension (III), with the proviso that the weight ratio of inorganic oxidic substance (I) to transition metal composition (IIb) is from 1:0.01 to 1:2, preferably from 1:0.2 to 1:1.5, the suspension (III) is evaporated to dryness at below 200° C., preferably below 160° C., and above the melting point of the oxahydrocarbon (IIa) used, a solid-phase intermediate (IV) being formed, and (1.2) thereafter (1.2.1) the solid-phase intermediate (IV) obtained from stage (1 1) and (1.2.2) a solution, in an organic solvent, of an aluminum compound (V) of the formula $$AlR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is a number from 1 to 3, preferably 2, are brought into contact with one another to form a suspension, with the proviso that the weight ratio of the solid-phase intermediate (IV) to the aluminum compound (V) is from 1:0.05 to 1:2, preferably from 1:0.1 to 1:1, and the resulting suspended solid-phase product (VI) is the transition metal catalyst component (1).

Regarding the novel process, the following may be stated by way of explanation:

Provided that the characteristic features are taken into account, the polymerization process as such can be carried out in virtually any relevant conventional technological embodiment, for example as a suspension polymerization or a dry-phase polymerization. The technological embodiments mentioned, i.e. the technological variants of the Ziegler polymerization of olefins, are well known from the literature and in practice, so that a more detailed description of these is unnecessary here. However, it should be stated that, in the novel process, the components of the catalyst system can be introduced into the polymerization space in a variety of ways; for example, (i) the transition metal component (1), the organoaluminum component (2) and the organohalogen component (3) can all be introduced together at the same point, (ii) the same three components can each be introduced at a separate point, (iii) the transition metal component (1) on the one hand and a mixture of (2) and (3) on the other hand can be introduced at separate points, a procedure which may be particularly advantageous, or (iiii) a mixture of the transition metal component (1) and the organohalogen component (3) on the one hand and the organoaluminum component (2) on the other hand can be introduced at separate points.

The novel process, which is preferably carried out by a continuous procedure, is useful for the preparation of homopolymers of ethene, but principally for the preparation of copolymers of ethene with minor amounts of $C_3$–$C_8$-α-monoolefins, in particular $C_4$–$C_6$-α-monoolefins. The monoolefins can be in the form of individual compounds or mixtures of two or more individual compounds. α-Monoolefins which are particularly suitable for the copolymerization are the straight-chain compounds, such as propene, n-but-1-ene, n-pent-1-ene, n-hex-1-ene, n-hept-1-ene and n-oct-1-ene, the most useful polymers once again being obtained using n-but-1-ene and n-hex-1-ene (or mixtures of these two α-olefins), in particular polymers which contain, as copolymerized units, 0.1–10 molar units of the higher α-monoolefin or α-monoolefins per 100 molar units of ethene.

The molecular weights of the polymers can be regulated in a relevant conventional manner, in particular using hydrogen as a regulator.

Regarding the transition metal catalyst component (1) employed in the novel process, the following may be stated specifically:

It is prepared in two stages which are denoted by (1.1) and (1.2) above and below.

In stage (1.1) a finely divided inorganic oxidic substance (I) of the type defined above is brought into contact with a particular solution (II) defined above, and the resulting suspension (III) is evaporated to dryness (formation of a solid-phase intermediate (IV)). In stage (1.2), the latter is brought into contact with a solution of a particular aluminum compound (V) defined above, a suspension once again being formed; the resulting suspended solid-phase product (VI) is the novel catalyst component (1).

Specifically, the procedure is as follows: Stage (1.1)

The inorganic oxidic substance (I) as such or suspended in an oxahydrocarbon (advantageously an oxahydrocarbon as defined under (IIa), the suspension containing not less than 5% by weight of solids) is combined with the solution (II), and the resulting suspension (III) is then evaporated down.

The preparation of solution (II) itself can be carried out in a conventional manner, and to this extent no special features are involved.

As a final measure in stage (1.1), the suspension (III) is evaporated to dryness, the solid-phase intermediate (IV) being obtained. This procedure can be carried out, while maintaining the above temperature conditions, by a conventional method for evaporating down suspensions under mild conditions. This means that it is generally advantageous (and may be absolutely necessary in the case of relatively high molecular weight hydrocarbons (IIa)) to carry out the evaporation under more or less greatly reduced pressure. As a general rule, the combination of temperature and pressure is chosen so that the evaporation process is complete after about 1-10 hours. It is also advantageous to carry out the evaporation while continuously keeping the treated material homogeneous; for example, rotary evaporators have proven useful for this purpose. A residual amount of oxahydrocarbon, for example an amount bound as a result of complex formation, generally does not have an adverse effect on the solid-phase intermediate (IV).

Stage (1.2)

First, a 0.1-50, preferably about 25, per cent strength by weight suspension of the solid-phase intermediate (IV) and a 5-80, preferably about 20, per cent strength by weight solution of the aluminum compound (V) are prepared separately, particularly suitable suspending agents or solvents being hydrocarbons, especially relatively low-boiling alkane hydrocarbons, e.g. hexanes, heptanes or gasolines. The suspension and the solution are then combined in amounts such that the desired weight ratio is obtained. This combination is generally carried out by introducing the solution into the stirred suspension, since this procedure is more practical than the converse one, which is also possible. At from $-25°$ to $120°$ C., in particular from $25°$ to $80°$ C., formation of the solid-phase product (VI), which is present in suspension, is complete within from 15 to 600, in particular from 60 to 300, minutes.

This product, advantageously directly in the form of the resulting suspension and, if necessary, after being washed by digestion or filtration, can be used as the transition metal catalyst component (1). If desired, however, it is also possible first to isolate the solid-phase product (VI) and then to use it as catalyst component (1); isolation can be effected, for example, by the following method: the product (VI) is separated from the liquid phase by filtration, is washed with pure liquid (for example of the type also used as the suspending agent or solvent) and is then dried, for example under reduced pressure.

Regarding the composition of the transition metal components (1), the following may be stated specifically:

The inorganic oxidic substance (I) employed in stage (1.1) is generally an aluminosilicate or, in particular, a silicon dioxide; it is important that it possesses the properties required. We have found that the relevant conventional commercial carriers which have the stated specifications are suitable.

The solvent (IIa) used is a saturated aliphatic, or partially saturated aliphatic and partially aromatic, oxahydrocarbon of 1 or 2 oxa oxygen atoms and 4 to 18 carbon atoms, preferably 1 oxa oxygen atom and 4 to 10 carbon atoms, in particular a saturated alicyclic oxahydrocarbon of 1 oxa oxygen atom and 4 to 6 carbon atoms especially tetrahydrofuran. Apart from the last-mentioned compound, examples of other suitable oxahydrocarbons are (taking into account the above order) ethylene glycol dimethyl ether, anisole, tetrahydropyran and dioxane. The oxahydrocarbons can be used in the form of individual compounds or as mixtures of two or more individual compounds.

The vanadium trihalide/alcohol complex (IIb1) used is of the formula $VY_3 \cdot nZ\text{-OH}$, where Y is chlorine or bromine, preferably chlorine, n is from 1 to 6, preferably from 3 to 4, and Z is a monovalent saturated aliphatic, or partially saturated aliphatic and partially aromatic, hydrocarbon radical of not more than 10, preferably not more than 8, carbon atoms, in particular alkyl of not more than 6 carbon atoms. Moreover, the vanadium trihalide starting material can be one which is conventionally employed in Ziegler catalyst systems. Examples of suitable alcohol components (taking into account the above order) are methanol, ethanol, propan-2-ol, butan-2-ol and 2-methylbutan-2-ol. The complexes can be prepared by a conventional method, advantageously in situ, for example from vanadium trichloride and propan-2-ol in tetrahydrofuran as the solvent, for example according to D. C. Bradley and M. L. Mehta, Can. J. Chem. 40 (1962), 1710/3; these compounds, too, can be employed in the form of individual compounds or as mixtures of two or more individual compounds.

The titanium trihalide (IIb2) used can once again be one which is conventionally used in Ziegler catalyst systems, for example a product obtained in the reduction of a titanium tetrahalide by means of hydrogen, aluminum or an organoaluminum compound. Compounds which have been found to be particularly useful are, for example, trichlorides of the formula $TiCl_3$, as obtained in the reduction of titanium tetrachloride with hydrogen, and trichlorides of the formula $TiCl_3 \cdot \frac{1}{3} AlCl_3$, as obtained in the reduction of titanium tetrachloride by means of metallic aluminum. Alternatively, a titanium trihalide/alcohol complex of the type defined at the outset can be employed; the statements which apply to this complex are similar to those which apply in the case of the vanadium trihalide/alcohol complex (IIb1). The titanium trihalides and titanium trichloride/alcohol complexes can be employed in the form of individual compounds or as mixtures of two or more individual compounds.

The zirconium tetrahalide (IIb3), which may or may not be used, can likewise be one which is conventionally employed in Ziegler catalyst systems.

The aluminum compound (V) used in stage (1.2) can be, for example, a compound of the formula $Al(C_2H_5)_3$, $Al(C_2H_5)_2Cl$, $Al(C_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_4H_9)Cl_2$, $Al(C_2H_5)_2H$, $Al(C_4H_9)_2H$, $Al(C_3H_7)_2(OC_3H_7)$ or $Al(C_2H_5)_{1.5}(OC_2H_5)_{1.5}$, or isoprenylaluminum. We have found that aluminum compounds of the formulae $C_2H_5AlCl_2$ and $(C_2H_5)_2AlCl$, and isoprenylaluminum, are particularly useful. The aluminum compounds (V) can be employed in the form of individual compounds or as mixtures of two or more individual compounds.

Suitable organoaluminum catalyst components (2) are the relevant conventional compounds; examples of suitable individual compounds are those of the formulae $Al(C_2H_5)_3$, $Al(i-C_4H_9)_3$, $Al(n-C_4H_9)_3$ and $Al(C_8H_{17})_3$, and isoprenyl-aluminum.

Finally, the organohalogen catalyst component (3) employed can advantageously be a compound from the following classes:

(A) Saturated aliphatic halohydrocarbons, specific suitable compounds being those of the formulae $CCl_4$, $CHCl_3$, $CH_2Cl_2$, $CBr_4$, $CHBr_3$, $CFCl_3$, $CF_2Cl_2$ and $CF_3Cl$, in particular $CCl_4$, $CHCl_3$, $CH_2Cl_2$ and $CF_2Cl$ $CFCl_3$ is extremely useful.

(B) Olefinically unsaturated aliphatic halohydrocarbons, specific suitable compounds being those of the formulae $CH_2=CHCl$, $CH_2=CCl_2$, $CHCl=CCl_2$, $Cl_2C=CCl_2$, $CH_2=CH-CH_2Cl$, $CCl_2=CCl-CCl_3$, $CH_2=CHBr$ and $CH_2=CH-CH_2Br$, in particular $CH_2=CHCl$, $CH_2=CCl_2$ and $CH_2=CHBr$. $CH_2=CH-CH_2Cl$, $CCl_2=CCl-CCl_3$ and $CH_2=CH-CH_2Br$ are extremely useful.

(C) Acetylenically unsaturated aliphatic halohydrocarbons, specific suitable compounds being those of the formulae $CH\equiv C-CH_2Cl$, $CH\equiv C-CH_2Br$, $CH_3-C\equiv C-CH_2Cl$, $CH_3-C\equiv C-CH_2Br$, $C_2H_5-C\equiv C-CH_2Cl$ and $C_2H_5-C\equiv C-CH_2Br$, in particular $CH_3-C\equiv C-CH_2Cl$ and $CH_3C\equiv C-CH_2Br$. $CH\equiv C-CH_2Cl$ and $CH\equiv C-CH_2Br$ are extremely useful.

(D) Aromatic halohydrocarbons, specific suitable compounds being α-chlorotoluene, α,α-dichlorotoluene, α,α,α-trichlorotoluene, diphenylchloromethane, diphenyldichloromethane, triphenylchloromethane, α-bromotoluene, α,α-dibromotoluene and α,α,α-tribromotoluene, in particular bromotoluene. α-Chlorotoluene, α,α-dichlorotoluene and α,α,α-trichlorotoluene are extremely useful.

(E) Halogenated saturated aliphatic ketones, carboxylic acid chlorides and carboxylates, specific suitable compounds being hexachloroacetone, monochloroacetyl chloride, dichloroacetyl chloride, trichloroacetyl chloride, monobromoacetyl bromide, methyl monochloroacetate, methyl dichloroacetate and methyl trichloroacetate. Among these, preferred compounds are dichloroacetyl chloride, trichloroacetyl chloride, methyl trichloroacetate and in particular hexachloroacetone, monochloroacetyl chloride and methyl monochloroacetate.

(F) Halogenated olefinically unsaturated aliphatic ketones, carboxylic acid chlorides and carboxylates, specific suitable compounds being chloromethyl vinyl ketone, trichloromethyl vinyl ketone, 1-chloroacrylyl chloride, methyl 2,3,4,4-tetrachlorobut-2-enoate, ethyl 2,3,4,4-tetrachlorobut-2-enoate, n-butyl 2,3,4,4-tetrachlorobut-2-enoate, methyl perchlorocrotonate and ethyl perchlorocrotonate. Among these, chloromethyl vinyl ketone, trichloromethyl vinyl ketone, methyl perchlorocrotonate and n-butyl 2,3,4,4-tetrachlorobut-2-enoate are noteworthy.

(G) Halogenated aromatic carboxylic acid chlorides and carboxylates, specific suitable compounds being α-chlorophenylacetyl chloride, methyl α-chlorophenylacetate, ethyl α-chlorophenylacetate, methyl α,α-dichlorophenylacetate and ethyl α,α-dichlorophenylacetate. Of these, α-chlorophenylacetyl chloride, methyl α-chlorophenylacetate and methyl α,α-dichlorophenylacetate are noteworthy We have found that compounds from the stated classes which are most useful for the purpose of the invention are those from classes (A), (B), (C) and (D), followed by (E) and finally (F) and (G). The relevant compounds can be employed individually or as mixtures of two or more individual compounds.

EXAMPLE

Preparation of the transition metal catalyst component (1)

Stage (1.1)

The starting materials used were (1.1.1) 25.3 parts by weight of silicon dioxide ($SiO_2$, particle diameter 90–150 μm, pore volume: 1.7 cm$^3$/g, specific surface area 320 m$^2$/g) and (1.1.2) a solution of 100 parts by weight of tetrahydrofuran and 24 parts by weight of a transition metal composition consisting of 100 molar parts of a vanadium trihalide/alcohol complex of the formula $VCl_3.4ZOH$, where Z is isopropyl, 1.2 molar parts of a titanium trihalide of the formula $TiCl_3.\frac{1}{3}AlCl_3$ and 5.9 molar parts of zirconium tetrachloride. These two components were combined, and the resulting suspension was stirred for a short time. Thereafter, the solid-phase intermediate (IV) formed was isolated by stripping off the volatile constituents in a rotary evaporator brought to an operating pressure of 10 mbar and an operating temperature of 70° C.

Stage (1.2)

20 parts by weight of the solid-phase intermediate (IV) obtained in stage (1.1) were suspended in 103 parts by weight of n-heptane, a solution of 8 parts by weight of diethyl-aluminum chloride in 17 parts by weight of n-heptane was added to this suspension, and the resulting suspension was stirred for a short time at 65° C. The suspension was then filtered, and the residue was washed three times with n-heptane and dried under reduced pressure. Analysis of the resulting solid-phase product (VI), ie. the catalyst component (1), showed that it contained 0.00145 mole of transition metals per g.

Polymerization

The polymerization was carried out by a continuous procedure, in a cylindrical polymerization reactor which had a capacity of 1,500 liters and a height:diameter ratio of 2.1:1.0, was equipped with a helical stirrer, and, during the polymerization in the continuous steady state, was filled to 5/7 of its height with a polymerization medium comprising small polymer particles.

The specific embodiment of the polymerization process (cf. British Pat. No. 1,552,438) was such that the polymerization medium was a concentric stirred bed comprising small polymer particles, with the provisos that (i) the polymerization medium was moved upward in the peripheral region of the stirred bed and downward in the central region of this bed, in such a manner that the Froude number in the stirred bed was 2.67, and (ii) the heat of polymerization was removed from the polymerization medium essentially by flash cooling, this being effected as follows:

(ii$_1$) the mixture of monomers to be polymerized was brought, outside the reaction space, to a temperature which was 70° C. below that in the reaction medium and to a pressure which was 65 bar above that in the reaction medium, (ii$_2$) an excess amount of this mixture was let down into the stirred bed, (ii$_3$) the residual amount (about 90%) of the mixture of monomers which was not consumed by polymerization was removed from the reaction space, and (ii$_4$) this residual amount was supplemented by the amount of monomers consumed by polymerization, the temperature and pressure conditions chosen for (ii$_1$) were re-established, and the mixture was then recycled and let down into the stirred bed.

Under these conditions, a mixture (ii$_2$) consisting of 97.5 vol. % of ethylene, 1.5 vol. % of but-1-ene and 1.0 vol. % of hydrogen (as a molecular weight regulator) was polymerized at 100° C. and in the absence of liquid diluents, the pressure in the reactor being kept constant at bar.

In this procedure, the Ziegler catalyst system employed consisting of (1) 6 g/hour of the transition metal catalyst component described above, (2) 3 g/hour of triisobutyl-aluminum as the organoaluminum catalyst component and (3) 0.45 g/hour of 3-chloroprop-1-yne as the organohalogen catalyst component, the atomic ratio of (the sum of) the transition metals from component (1) to aluminum from component (2) being 1:1.74, and the molar ratio of component (2) to component (3) being 1:0.4.

160 kg/hour of an ethene/but-1-ene copolymer containing, as copolymerized units, 0.7 molar unit of but1-ene per 100 molar units of ethene were obtained in this manner.

The copolymer possessed very good stress cracking resistance, had a high molecular weight but could be processed without difficulty, and possessed excellent rigidity.

The stated properties of the copolymer, as well as other properties, fluctuated only slightly around the particular mean value during several days' operation of the polymerization.

We claim:

1. A process for the preparation of copolymers of ethylene with minor amounts of C$_3$–C$_8$-α-monoolefins by polymerization of the monomers at from 50° to 125° C. and under a pressure of from 5 to 60 bar, the improvement which comprises using a Ziegler catalyst system comprising (1) a transition metal catalyst component, (2) an organoaluminum catalyst component of the formula AlR$_3$ where R is C$_2$–C$_8$-alkyl, and (3) an organohalogen catalyst component (cocatalyst), selected from the group consisting of those of the formulae CFCl$_3$, CCl$_4$, CHCl$_3$, CH$_2$Cl$_2$, CF$_2$Cl$_2$, CH$_2$=CH—CH$_2$Cl, CCl$_2$=CCl—CCl$_3$, CH≡C—CH$_2$Cl, α-chlorotoluene, α,α-dichlorotoluene, α,α,α-trichlorotoluene, methyl perchlorocrotonate and n-butyl 2,3, 4, 4-tetrachlorobut-2-enoate with the provisos that the atomic ratio of the transition metal from the catalyst component (1) to aluminum from the catalyst component (2) is from 1:0.2 to 1:50, and the molar ratio of the organoaluminum catalyst component (2) to the organohalogen catalyst component (3) is from 1:0.01 to 1:10, wherein the transition metal catalyst component (1) used is a solid-phase product (VI), obtained by a method in which (1.1) first (1.1.1) a finely divided, porous silicon dioxide (I), which has a particle diameter of from 1 to 400 μm, a pore volume of from 1 to 2.5 cm$^3$/g and a specific surface area of from 200 to 400 m$^2$/g and (1.1.2) a solution (II), as obtained on combining (11a) 100 parts by weight of a saturated alicyclic oxahydrocarbon of 1 oxa oxygen atom and 4 to 6 carbon atoms an (11b) from 1 to 50 parts by weight of a mixture of (11b1) 100 molar parts of a vanadium trihalide/alcohol complex of the formula VY$_3$.nZ-OH, wherein Y is chlorine, n is from 1 to 6, and Z is an alkyl of not more than 6 carbon atoms, (IIb2) from 0.5 to 100 molar parts of a titanium trichloride or of a titanium trihalide/alcohol complex of the formula TiY$_3$.nZOH, where Y is chlorine, n is from 1 to 6 and Z is an alkyl of not more than 4 carbon atoms and (IIb3) from 3 to 200 molar parts of a zirconium tetrachloride, are brought into contact with one another to form a suspension (III), with the proviso that the weight ratio of silicon dioxide (I) to transition metal composition (IIb) is from 1:0.2 to 1:1.5, the suspension (III) is evaporated to dryness at below 160° C. and above the melting point of the oxahydrocarbon (IIa) used, a solid-phase intermediate (IV) being formed, and (1.2) thereafter (1.2.1) the solid-phase intermediate (IV) obtained from stage (1.1) and (1.2.2) a solution, in an organic solvent, of an aluminum compound (V) of the formula AlR$_m$X$_{3-m}$ where X is chlorine, R is C$_2$–C$_8$-alkyl, and m is the number 2, are brought into contact with one another to form a suspension, with the proviso that the weight ratio of the solid-phase intermediate (IV) to the aluminum compound (V) is from 1:0.1 to 1:1, and the resulting suspended solid-phase product (VI) is the transition metal catalyst component (1).

2. The process of claim 1 wherein component IIa is tetrahydrofuran; in component IIb1 n is 3 or 4; and in component IIb2 n is 3 or 4.

3. The process of claim 1 wherein component (IIb2) consists solely of a titanium trihalide/alcohol complex of the formula TiY$_3$-nZOH, where Y is chlorine, n is from 1 to 6, and Z is an alkyl of not more than 4 carbon atoms.

* * * * *